(12) United States Patent
Kuchibhotla et al.

(10) Patent No.: US 9,066,264 B2
(45) Date of Patent: Jun. 23, 2015

(54) STATUS REPORT TRIGGERING IN WIRELESS COMMUNICATION SYSTEM

(75) Inventors: Ravi Kuchibhotla, Gurnee, IL (US);
Satyanarayana B Rao, Austin, TX (US); Yishen Sun, Libertyville, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 1276 days.

(21) Appl. No.: 11/865,723

(22) Filed: Oct. 1, 2007

(65) Prior Publication Data
US 2009/0086656 A1    Apr. 2, 2009

(51) Int. Cl.
*H04B 7/00*       (2006.01)
*H04W 28/12*      (2009.01)
*H04L 12/801*     (2013.01)

(52) U.S. Cl.
CPC .............. *H04W 28/12* (2013.01); *H04L 47/10* (2013.01); *H04L 47/14* (2013.01); *H04L 47/34* (2013.01)

(58) Field of Classification Search
USPC ............... 370/310, 236, 252, 328, 395.3, 476
See application file for complete search history.

(56) References Cited

U.S. PATENT DOCUMENTS

| 7,715,314 | B2* | 5/2010 | Igarashi et al. | 370/230 |
| 8,051,353 | B2* | 11/2011 | Maas et al. | 714/748 |
| 8,665,815 | B2* | 3/2014 | Chun et al. | 370/329 |
| 2007/0064631 | A1* | 3/2007 | Tseng et al. | 370/278 |
| 2007/0091810 | A1* | 4/2007 | Kim et al. | 370/236 |
| 2008/0008152 | A1* | 1/2008 | Lohr et al. | 370/342 |
| 2008/0043619 | A1* | 2/2008 | Sammour et al. | 370/231 |
| 2008/0056148 | A1* | 3/2008 | Wu | 370/252 |
| 2008/0101608 | A1* | 5/2008 | Jiang et al. | 380/270 |
| 2009/0122796 | A1* | 5/2009 | Garcia et al. | 370/389 |
| 2010/0054139 | A1* | 3/2010 | Chun et al. | 370/252 |
| 2014/0050106 | A1* | 2/2014 | McNaughton et al. | 370/252 |

FOREIGN PATENT DOCUMENTS

| EP | 1641190 A1 | 3/2006 |
| EP | 1764942 A2 | 3/2007 |
| WO | 9842108 A1 | 9/1998 |

OTHER PUBLICATIONS

"3rd Generation Partnership Project;Technical Specification Group Radio Access Network;Evolved Universal Terrestrial Radio Access (E-UTRA)Radio Link Control (RLC) protocol specification(Release 8)" 3GPP Draft; TS 36.322 V023 (With Revision Marks), 3rd Generation Partnership Project (3GPP), Mobile Competence Centre ; 650, Route Des Lucioles ; F.*

(Continued)

*Primary Examiner* — Khawar Iqbal
(74) *Attorney, Agent, or Firm* — Lerner, David, Littenberg, Krumholz & Mentlik, LLP

(57) ABSTRACT

A method for status report triggering in a wireless communication entity is disclosed. The method comprises receiving a data unit segment wherein the data unit segment is a portion of an original data unit that has been re-segmented for transmission into a plurality of data unit segments. Then, determining that the data unit segment includes a last segment flag indicating that the data unit segment is a last segment of the plurality of data unit segments. Further, transmitting a status report containing a status report for the re-segmented data unit in response to determining that the data unit segment includes a last segment flag indicating that the data unit segment is a last segment.

21 Claims, 2 Drawing Sheets

(56) References Cited

OTHER PUBLICATIONS

3GPP; "3rd Generation Partnership Project; Technical Specification Group Radio Access Network; Radio Link Control (RLC) Protocol Specification (Release 7)"; TS 25.322 V7.3.0 (Jun. 2007).

3GPP TSG-RAN WG2 #58BIS; LG Electronics Inc; "RLC Status Report Trigger"; R2-072620; Jun. 25-29, 2007.

3GPP; 3rd Generation Partnership Project; Technical Specification Group Radio Access Network; Evolved Universal Terrestrial Radio Access (E-UTRA) Radio Link Control (RLC) Protocol Specification (Release 8); TS 36.322 V0.1.40 (Jun. 2007).

TSG-RAN WG2 Meeting 58BIS TDOC R2-072568, RLC Status Reporting Mechanisms; Jun. 25-29, 2007.

* cited by examiner though polling bits may not include a polling bit, in order to reduce the overhead. Polling bits are intended to trigger a status report by the receiving wireless communication device. Even if the polling bit is included in a PDU segment header, the sender may not be able to set it due to the poll prohibit timer not having expired thus prohibiting the sender from

STATUS REPORT TRIGGERING IN WIRELESS COMMUNICATION SYSTEM

FIELD OF THE DISCLOSURE

The present disclosure relates generally to wireless communications, and more specifically to status report triggering for received protocol data unit methods.

BACKGROUND

In the 3GPP specification, the radio link control (RLC) protocol layer is responsible for the delivery of protocol data units (PDUs) over the radio interface. An acknowledge mode may be used to ensure reliable delivery of a PDU. In this mode, the receiver sends a status report indicating the successful reception of a PDU. It is known to include a polling bit in the RLC PDU header to trigger a status report from the receiver indicating that PDU have been received. In another solution, the RLC PDU header may not include a polling bit but a status report is instead triggered by a separate polling control unit sent to the receiver.

In some wireless communication protocols, it has been suggested that the RLC layer re-segment a PDU if it has not been received successfully after the initial transmission. When retransmitting the same PDU, the entire PDU may be transmitted in individual segments, also know as re-segmented PDU segments. For example, an original PDU of size 1000 bytes can be re-segmented into three PDU segments of size 350 bytes, 400 bytes and 250 bytes. Three segments is an arbitrary number and only used as an example. For the newly generated PDU segments, status report is needed after the transmission. Further, it is beneficial for the sender of the PDU to know the status of the PDU reception so that the transmission window can be advanced and the receiver buffer can be freed up for new data. One approach would be to include a polling bit in the data unit being re-segmented. However, in case of some RLC protocols, it might be inefficient to include a polling bit in every data unit being transmitted, where the bit value is toggled between indication that a status report is required or not. Furthermore, due to the overall configuration of the protocol, a poll prohibit timer may be running and as a consequence prevent the setting of the poll bit. Alternatively the status prohibit timer may be running and thereby prevent the transmission of the status report. However, there is significant benefit in receiving a status report as soon as the last segment of the re-segmented data unit has been received. For instance, in some cases this may allow the sender to advance the transmission window, there by allowing further packet transmission to the receiver and thus ultimately improving the user experience. Thus it would be beneficial to identify an efficient mechanism to trigger a status report following transmission of the re-segmented PDU.

The various aspects, features and advantages of the disclosure will become more fully apparent to those having ordinary skill in the art upon careful consideration of the following Detailed Description thereof with accompanying drawings described below. The drawings may have been simplified for clarity and are not necessarily drawn to scale.

DETAILED DESCRIPTION

Figure 1:
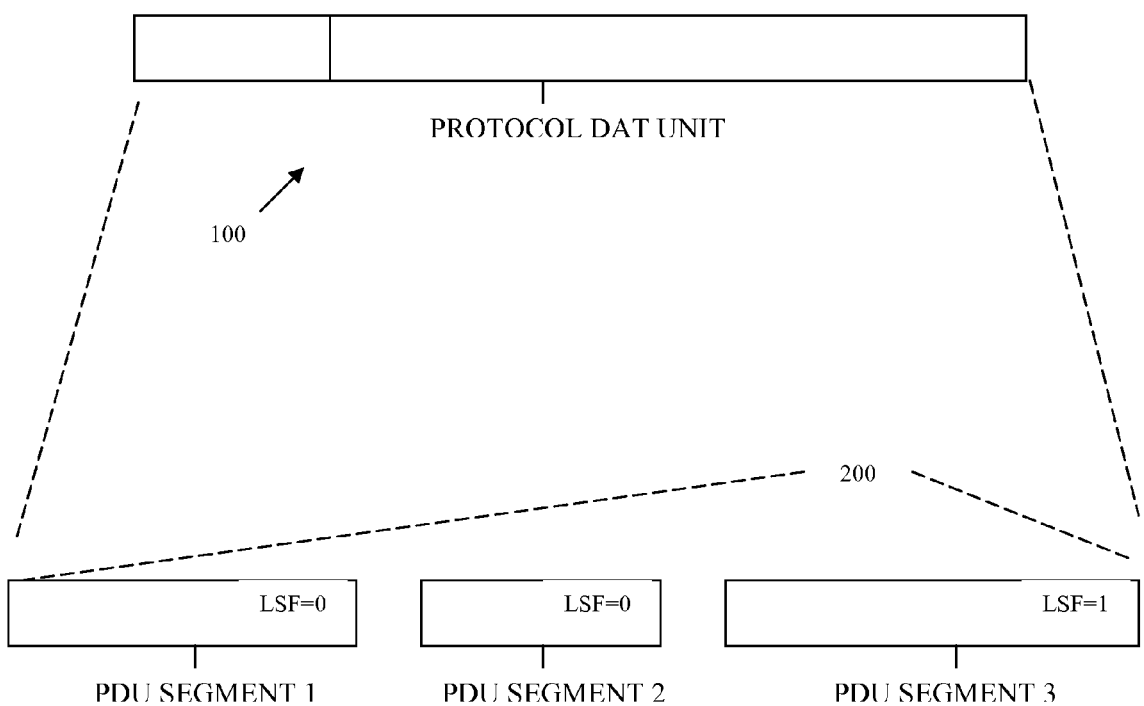
FIG. 1 is one embodiment of a re-segmented protocol data unit.

FIG. 1 illustrates one embodiment of a protocol data unit (PDU) 100 that is used in 3GPP communication systems. The PDU has been re-segmented into a re-segmented PDU 200 (i.e. data unit segment). In this embodiment, the PDU 100 has been re-segmented into three segments, a first PDU segment 101, second PDU segment 102 and third PDU segment 103. All three re-segmented PDU segments (101, 102 and 103) have a last segment flag field (LSF). The segment that is the last segment of the re-segmented PDU, the third segment in this embodiment, has a "1" in the LSF indicating that this is the last segment. The other segments, the first segment 101 and the second segment 102 will have a "0" in the LSF. The LSF included within the last segment of a re-segmented data unit triggers a STATUS report of a new type that is optimized for the purpose of status reporting of re-segmented data units.

The PDU sender, a base station in one embodiment, may decide to re-segment the PDU 100 for various reasons. In one embodiment the PDU 100 is re-segmented in response to a previous failed transmission attempt of the PDU 100. In another embodiment, the PDU 100 is re-segmented due to change of radio conditions or radio resource allocation strategy. The size of each segment of the re-segmented PDU 200 may be equal or may vary from segment to segment. When performing re-segmentation, the sender will include a "last segment flag" indication in the last segment of the re-segmented PDU. The flag indicates whether this PDU segment is the last segment of the original PDU. For example, for the previous example of a 1000 byte PDU re-segmented into 350 bytes, 400 bytes and 250 bytes each, the "last segment flag" of the 350 bytes and 400 bytes segments will not be set, and the flag will be set for the 250 bytes PDU segment, which is the last one.

In one embodiment, the base station is a 3GPP conforming base station for telecommunication systems. In this embodiment, the base station communicates with a wireless communication device also known as the user equipment (UE). The base station and the UE exchange data which may be traffic data such as voice communications or user data exchanges and control data associated with the traffic data.

Figure 2:
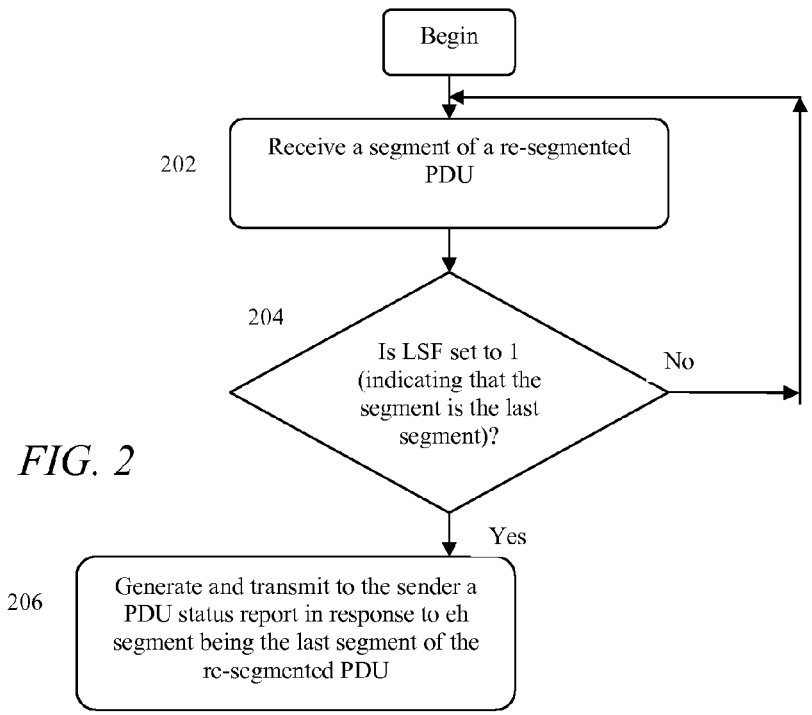
FIG. 2 is one embodiment of the triggering of a status report.

At the wireless communication device, a method for triggering a re-segmented protocol data unit (PDU) STATUS report transmission to the base station of the communication system is illustrated in FIG. 2. In this embodiment the wireless communication device receives a PDU 202 that has been re-segmented (re-segmented PDU) and transmitted by the base station. The wireless communication device determines 204 that one of the PDU segments includes a last segment field (LSF) which is set to positive, (i.e. "1") indicating that the segment is the last segment of the re-segmented PDU. In response to the received re-PDU segment with the LSF flag set, the wireless communication device transmits 206 a status report. In one embodiment this report indicates a segment identity (i.e. the segment index number out of total segments, or the segment offset with respect to the original PDU) and the associated status of the identified segment. In another embodiment the status report identifies a missing segment.

Re-segmented PDUs may not include a polling bit, in order to reduce the overhead. Polling bits are intended to trigger a status report by the receiving wireless communication device. Even if the polling bit is included in a PDU segment header, the sender may not be able to set it due to the poll prohibit timer not having expired thus prohibiting the sender from setting the poll bit. The last segment however of the re-segmented PDU, in a 3GPP system, includes the last segment field indicator to indicate that this is the last segment of the re-segmented PDU.

Figure 3:
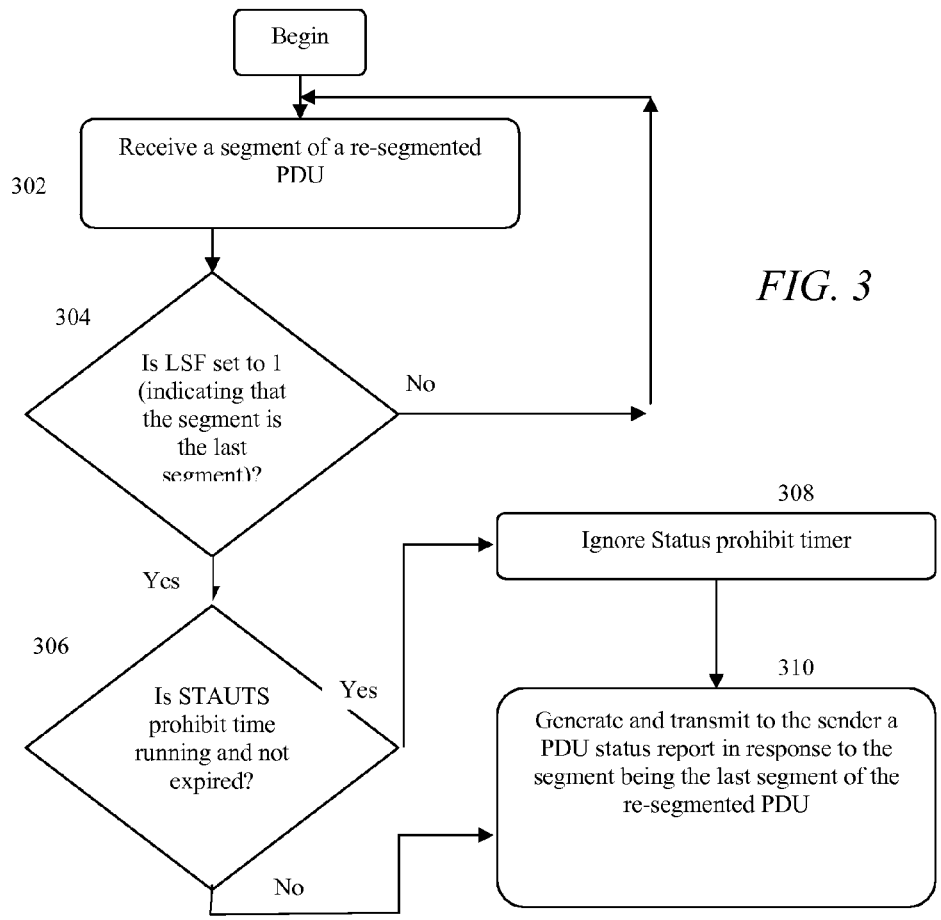
FIG. 3 is another embodiment of the triggering of a status report.

FIG. 3 illustrates a method for triggering a status report wherein a status prohibit timer is activated in the wireless communication device (i.e. the receiving device). In one embodiment, wherein a STATUS prohibit timer is running, and has not expired 306, and the receiver has received a RLC PDU 302 segment containing LSF, indicating that this is the last segment (i.e. set to "1") 304, the receiver shall ignore 308 the running timer and generate and transmit 310 a STATUS report containing status of the re-segmented PDU.

In the preferred embodiment, the STATUS report of a new type "PDU Segment STATUS" is sent in response to receiving a segment containing LSF. The STATUS report contains the segment identity and associated status.

In another embodiment, the segment identities of the missing segments for the re-segmented PDU are included in the status report. The transmission of the status report, implicitly ACKs the segment containing LSF.

In one embodiment, wherein the reception of the segment containing the LSF results in the successful reception of the complete PDU, the receiver can transmit an optimized STATUS report simply indicating ACK for the PDU. In this case the status report does not individually ACK each segment of the re-segmented PDU but sends a status report for the entire PDU by simply sending a STATUS report for the original PDU by including the SN of the original PDU.

In one embodiment the receiver sends a STATUS report in response to receiving a PDU segment including the last segment flag indicating last segment only if a timer has expired. This timer is configured in one embodiment by a base station and is set so as to allow for hybrid ARQ retransmissions of any missing segments to be completed thereby ensuring that a premature missing segment report is not transmitted to the sender causing unnecessary retransmissions. The status report is delayed only if the receiver determines there are missing segments.

In another embodiment, the receiving unit is configured with a timer. The receiver starts the timer when it receives a first data unit segment, not necessarily the data unit segment with a byte offset equal to zero, of a re-segmented protocol data unit. If the data unit segment of this re-segmented protocol data unit with the "last segment flag" is not received prior to the expiry of the timer, the receiver sends a status report to the sender. This ensures that a status report is sent within a fixed time duration following the sender's decision to re-segment a protocol data unit; in this case, if the data unit segment with the LSF indication is missing, then the timer will also ensure that a status report is sent to the sender.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method for status report triggering in a wireless communication entity, the method comprising:
   receiving a first data unit segment of a re-segmented data unit to produce a first received data unit segment, wherein the re-segmented data unit is an original data unit that has been re-segmented into a plurality of data unit segments, the plurality of data unit segments including at least the first data unit segment and a last data unit segment;
   responsive to receiving the first data unit segment, starting a timer;
   receiving a second data unit segment of the re-segmented data unit to produce a second received data unit segment;
   determining whether the second received data unit segment is the last data unit segment of the plurality of data unit segments;
   responsive to determining that the second received data unit segment is the last data unit segment of the plurality of data unit segments, transmitting the status report for the re-segmented data unit;
   responsive to determining that the second received data unit segment is not the last data unit segment of the plurality of data unit segments, determining whether the timer has expired; and
   responsive to determining that the timer has expired prior to receipt of the last data unit segment of the plurality of data unit segments, transmitting the status report for the re-segmented data unit.

2. The method of claim 1, wherein a quantity of data unit segments constituting the plurality of data unit segments is unknown to the wireless communication entity prior to receipt of the last data unit segment of the re-segmented data unit.

3. The method of claim 1, further comprising:
   determining that at least one data unit segment from the plurality of data unit segments was not received, to produce at least one missing data unit segment; and
   including at least one segment identity of the at least one missing data unit segment in the status report.

4. The method of claim 1, further comprising:
   prior to transmitting the status report, determining whether a STATUS prohibit timer is running and has not expired; and
   responsive to determining that the STATUS prohibit timer has not expired, ignoring a status of the STATUS prohibit timer to allow the status report to be transmitted.

5. The method of claim 1 wherein the status report includes a segment identity.

6. The method of claim 5, wherein the segment identity is a segment offset with respect to the original data unit.

7. The method of claim 1, further comprising:
   prior to transmission of the status report, inserting a segment status into the status report.

8. The method of claim 1, further comprising:
   prior to transmitting the status report, determining whether all data unit segments of the plurality of data unit segments have been received; and
   when all data unit segments of the plurality of data unit segments have been received, inserting into the status report a sequence number of the original data unit to indicate that all data unit segments of the re-segmented data unit have been received successfully.

9. A method for status report triggering in a wireless commutation entity, the method comprising:
   receiving a first data unit segment of a re-segmented data unit, the first data unit segment including a last segment flag;
   determining whether the last segment flag of the first data unit segment indicates that the first data unit segment is a last data unit segment of the re-segmented data unit;
   responsive to determining that the last segment flag of the first data unit segment indicates that the first data unit segment is not the last data unit segment of the re-segmented data unit, starting a timer;

after the timer has been started, receiving a second data unit segment of the re-segmented data unit, the second data unit segment including a last segment flag;

determining whether the last segment flag of the second data unit segment indicates that the second data unit segment is the last data unit segment of the re-segmented data unit;

responsive to determining that the last segment flag of the second data unit segment indicates that the second data unit segment is the last data unit segment of the re-segmented data unit, sending the STATUS report for the re-segmented data unit, wherein the STATUS report includes at least one segment identity and at least one associated status;

responsive to determining that the last segment flag of the second data unit segment does not indicate that the second data unit segment is the last data unit segment of the re-segmented data unit, determining whether the timer has expired; and responsive to determining that the timer has expired prior to receipt of the last data unit segment of the re-segmented data unit, sending the STATUS report for the re-segmented data unit.

10. The method of claim 9, wherein the at least one associated status indicates that at least one data unit segment of the re-segmented data unit is missing.

11. The method of claim 9, wherein the at least one segment identity identifies a received data unit segment of the re-segmented data unit.

12. The method of claim 9, wherein the at least one segment identity identifies data unit segments of the re-segmented data unit that were not received.

13. A method for generating a status report comprising:

receiving a first protocol data unit (PDU) segment, the first PDU segment including a last segment field indicator;

determining whether the last segment field indicator of the first PDU segment indicates that the first PDU segment is a last PDU segment of a plurality of PDU segments forming a PDU;

responsive to determining that the last segment field indicator of the first PDU segment indicates that the first PDU segment is not the last PDU segment of the plurality of PDU segments, starting a timer;

after the timer has been started, receiving a second PDU segment, the second PDU segment including a last segment field indicator;

determining whether the last segment field indicator of the second PDU segment indicates that the second PDU segment is the last PDU segment of the plurality of PDU segments;

responsive to determining that the last segment field indicator of the second PDU segment indicates that the second PDU segment is the last PDU segment of the plurality of PDU segments, generating the status report including a segment identity and a status of the second PDU segment;

responsive to determining that the last segment field indicator of the second PDU segment does not indicate that the second PDU segment is the last PDU segment of the plurality of PDU segments, determining whether the timer has expired; and responsive to determining that the timer has expired prior to receipt of the last PDU segment of the plurality of PDU segments, generating the status report for the PDU.

14. A method for status report triggering in a wireless communication entity, the method comprising:

receiving a first protocol data unit (PDU) segment of a re-segmented PDU to produce a first received PDU segment, wherein the re-segmented PDU is an original PDU that has been re-segmented into a plurality of PDU segments, the plurality of PDU segments including at least the first PDU segment and a last PDU segment;

responsive to receiving the first PDU segment, starting a timer;

after the timer has been started, receiving a second PDU segment of the re-segmented PDU to produce a second received PDU segment;

determining whether the second received PDU segment includes a last segment flag indicating that the second received PDU segment is the last PDU segment of the plurality of PDU segments;

responsive to determining that the last segment flag indicates that the second received PDU segment is the last PDU segment of the plurality of PDU segments, transmitting the status report for the re-segmented PDU;

responsive to determining that the last segment flag indicates that the second received PDU segment is not the last PDU segment of the plurality of PDU segments, determining whether the timer has expired; and responsive to determining that the timer has expired prior to receipt of the last PDU segment of the plurality of PDU segments, transmitting the status report for the re-segmented data unit.

15. The method of claim 14, wherein a length of each PDU segment of the plurality of PDU segments is variable.

16. The method of claim 14, further comprising:

prior to transmitting the status report, determining whether a STATUS prohibit timer is running and has not expired; and responsive to determining that the STATUS prohibit timer has not expired, ignoring a status of the STATUS prohibit timer to allow the status report to be transmitted.

17. The method of claim 14, further comprising:

determining that the last PDU segment of the plurality of PDU segments is missing.

18. The method of claim 14 wherein the status report includes a segment identity.

19. The method of claim 18, wherein the segment identity is a segment offset with respect to the original PDU.

20. The method of claim 14, further comprising:

prior to transmission of the status report, inserting a segment status into the status report.

21. The method of claim 14, further comprising:

prior to transmitting the status report, determining whether all PDU segments of the plurality of PDU segments have been received; and when all data unit segments of the plurality of PDU segments have been received, inserting into the status report a sequence number of the original PDU to indicate that all PDU segments of the re-segmented PDU have been received successfully.

* * * * *